United States Patent
Piednoel

(10) Patent No.: US 12,522,228 B2
(45) Date of Patent: Jan. 13, 2026

(54) WORKLOAD EXECUTION IN DETERMINISTIC PIPELINES

(71) Applicant: Mercedes-Benz Group AG, Stuttgart (DE)

(72) Inventor: Francois Piednoel, Sunnyvale, CA (US)

(73) Assignee: Mercedes-Benz Group AG, Stuttgart (DE)

(*) Notice: Subject to any disclaimer, the term of this patent is extended or adjusted under 35 U.S.C. 154(b) by 221 days.

(21) Appl. No.: 18/200,337

(22) Filed: May 22, 2023

(65) Prior Publication Data
US 2024/0391477 A1    Nov. 28, 2024

(51) Int. Cl.
| | |
|---|---|
| *B60W 50/06* | (2006.01) |
| *B60W 50/00* | (2006.01) |
| *B60W 60/00* | (2020.01) |
| *G06F 9/38*  | (2018.01) |
| *G06F 9/48*  | (2006.01) |

(52) U.S. Cl.
CPC ........ *B60W 50/06* (2013.01); *B60W 50/0097* (2013.01); *B60W 50/0098* (2013.01); *B60W 60/0015* (2020.02); *G06F 9/4881* (2013.01); *B60W 2556/35* (2020.02); *G06F 9/3867* (2013.01)

(58) Field of Classification Search
CPC .......... B60W 50/06; B60W 50/0097; B60W 50/0098; B60W 60/0015; B60W 2556/35; G06F 9/4881; G06F 9/3867; G06F 2209/506; G06F 9/5038
See application file for complete search history.

(56) References Cited

U.S. PATENT DOCUMENTS

| | | | |
|---|---|---|---|
| 8,103,754 B1* | 1/2012 | Luong | G06F 9/5016 709/225 |
| 10,992,257 B2 | 4/2021 | Narla | |
| 11,386,013 B2 | 7/2022 | Shetty | |
| 11,388,054 B2 | 7/2022 | Bernat | |
| 11,410,266 B2 | 8/2022 | Matam | |
| 11,565,606 B2 | 1/2023 | Kazuno | |
| 11,573,856 B1 | 2/2023 | Ditty | |
| 2008/0177964 A1* | 7/2008 | Takahashi | G06F 11/2074 711/162 |

(Continued)

FOREIGN PATENT DOCUMENTS

| | | |
|---|---|---|
| CN | 110879546 A | 3/2020 |
| CN | 112149369 A | 12/2020 |

(Continued)

OTHER PUBLICATIONS

Francois Piednoel, Snug Silicon Valley 2023 Keynote, The Standardization Imperative for Chiplets. Mar. 29-30, 2023, Santa Clara, CA. https://www.synopsys.com/community/resources/videos/snug-keynotes.html.

(Continued)

*Primary Examiner* — Donald J Wallace
*Assistant Examiner* — Jalal C Coduroglu
(74) *Attorney, Agent, or Firm* — Mahamedi IP Law LLP

(57) ABSTRACT

A computing system includes a sensor data input chiplet to obtain sensor data from a sensor system of a vehicle, and one or more workload processing chiplets executing workloads in a set of independent pipelines based on the sensor data.

20 Claims, 7 Drawing Sheets

(56) References Cited

U.S. PATENT DOCUMENTS

| | | | |
|---|---|---|---|
| 2019/0325580 A1* | 10/2019 | Lukac | G06T 3/4038 |
| 2019/0391855 A1 | 12/2019 | Bernat | |
| 2020/0017114 A1 | 1/2020 | Santoni et al. | |
| 2022/0051467 A1* | 2/2022 | Woop | G06T 1/60 |
| 2022/0114028 A1 | 4/2022 | Peng et al. | |
| 2022/0126864 A1* | 4/2022 | Moustafa | H04W 4/46 |
| 2022/0206846 A1 | 6/2022 | Windh | |
| 2022/0283971 A1 | 9/2022 | Lee | |
| 2022/0297706 A1 | 9/2022 | Nilsson | |
| 2022/0342673 A1* | 10/2022 | Wang | G06N 3/044 |
| 2022/0414455 A1* | 12/2022 | Collins | G06F 17/16 |
| 2023/0032305 A1 | 2/2023 | Krishnani | |
| 2023/0036117 A1 | 2/2023 | Krishnani | |
| 2023/0063601 A1 | 3/2023 | Upadhyay | |
| 2023/0068168 A1* | 3/2023 | Estep | G06N 3/063 |
| 2023/0185624 A1 | 6/2023 | Yao | |
| 2023/0305993 A1 | 9/2023 | Davis | |
| 2024/0166147 A1* | 5/2024 | Carr | B60R 16/023 |
| 2024/0378090 A1 | 11/2024 | Piednoel | |

FOREIGN PATENT DOCUMENTS

| | | |
|---|---|---|
| CN | 114780227 A | 7/2022 |
| CN | 115688093 A | 2/2023 |
| GB | 2560708 | 9/2018 |
| KR | 20210015472 A | 2/2021 |
| WO | WO2023023975 | 3/2023 |

OTHER PUBLICATIONS

Zhou, Feichi, et al., "Near-sensor and in-sensor computing", Nature Electronics, vol. 3, No. 11, Nov. 17, 2020 (Nov. 17, 2020), pp. 664-671 (abstract).

Anonymous: "Redundancy for safety-compliant automotive & other devices", Mar. 12, 2014 (Mar. 12, 2014), pp. 1-12.

Frigerio Alessandro, "Functional-safety analysis of ASIL decomposition for redundant automotive systems", Apr. 21, 2022 (Apr. 21, 2022), pp. 1-228.

Shepard Paul, "ASIL Band ASIL D Compliant Processors for Automotive SoCs", Oct. 23, 2019 (Oct. 23, 2019), pp. 1-2.

International Search Report dated Apr. 10, 2024, PCT International Application No. PCT/EP2024/054619, pp. 1-16.

* cited by examiner

WORKLOAD EXECUTION IN DETERMINISTIC PIPELINES

BACKGROUND

Universal Chiplet Interconnect Express (UCIe) provides an open specification for an interconnect and serial bus between chiplets, which enables the production of large system-on-chip (SoC) packages with intermixed components from different silicon manufacturers. Autonomous vehicle computing systems may operate using chiplet arrangements that follow the UCIe specification. One goal of creating such computing systems is to achieve the robust safety integrity levels of other important electrical and electronic (E/E) automotive components of the vehicle.

SUMMARY

A computing system can include a sensor data input chiplet to obtain sensor data from a sensor system of a vehicle, and one or more workload processing chiplets that execute workloads in a set of independent pipelines based on the sensor data. In various implementations, the workload processing chiplets can execute the workloads in independent pipelines to perform a set of tasks for autonomously operating the vehicle. The set of tasks can include any combination of image stitching tasks, sensor fusion tasks, machine learning inference tasks, object detection tasks, object classification tasks, scene understanding tasks, motion prediction tasks, and the like.

In various implementations, the one or more workload processing chiplets can provide output of the set of independent pipelines to an application program for autonomously operating the vehicle. In particular, the application program can also be executed by the workload processing chiplets for performing motion planning and/or vehicle control tasks based on an inferred sensor view of the surrounding environment of the vehicle, where the inferred sensor view is outputted by the set of independent pipelines. For example, the independent pipelines can execute workloads in a deterministic manner based on dependencies in the workloads configured by a scheduling program. The workload processing chiplets can monitor and update a reservation table comprising workload entries that include cache addresses of workload data for executing a respective workload and dependency information to be resolved before executing the respective workload.

In particular, the sensor data input chiplet can obtain the sensor data and store the sensor data (e.g., image data, LIDAR data, radar data, ultrasonic data, etc.) in a cache memory of the computing system. According to examples described herein, the sensor data input chiplet can generate an identifier for the sensor data (e.g., an identifier for each obtained image from various cameras of the vehicle's sensor system) and indicate an address of the sensor data in the cache memory. The identifier and address of the sensor data can be referenced in the reservation table that includes workload identifiers, dependency information for each workload, and addresses of the necessary data to execute a particular workload. The computing system can include a shared memory that includes the reservation table, which can be referenced by the workload processing chiplets of the computing system to execute the workloads.

In various examples, the workload processing chiplets can execute workloads in an out-of-order workload manner. For example, when workloads are completed by the chiplets, dependency information for additional workloads in the reservation table can be updated to indicate so, and the additional workloads can become available for execution in the reservation table when no dependencies exist. In certain examples, the chiplets can monitor the reservation table by way of a workload window and instruction pointer arrangement, in which each entry of the reservation table is sequentially analyzed along the workload window by the workload processing chiplets. If a particular workload is ready for execution (e.g., all dependencies are resolved), the workload processing chiplets can execute the workload accordingly. As such, the reservation table is implemented as an out-of-order buffer where workloads are held until all dependencies (e.g., other workloads) are resolved. Accordingly, the chiplets can perform out-of-order execution on workloads in a set of independent pipelines that may be certified based on their deterministic nature.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
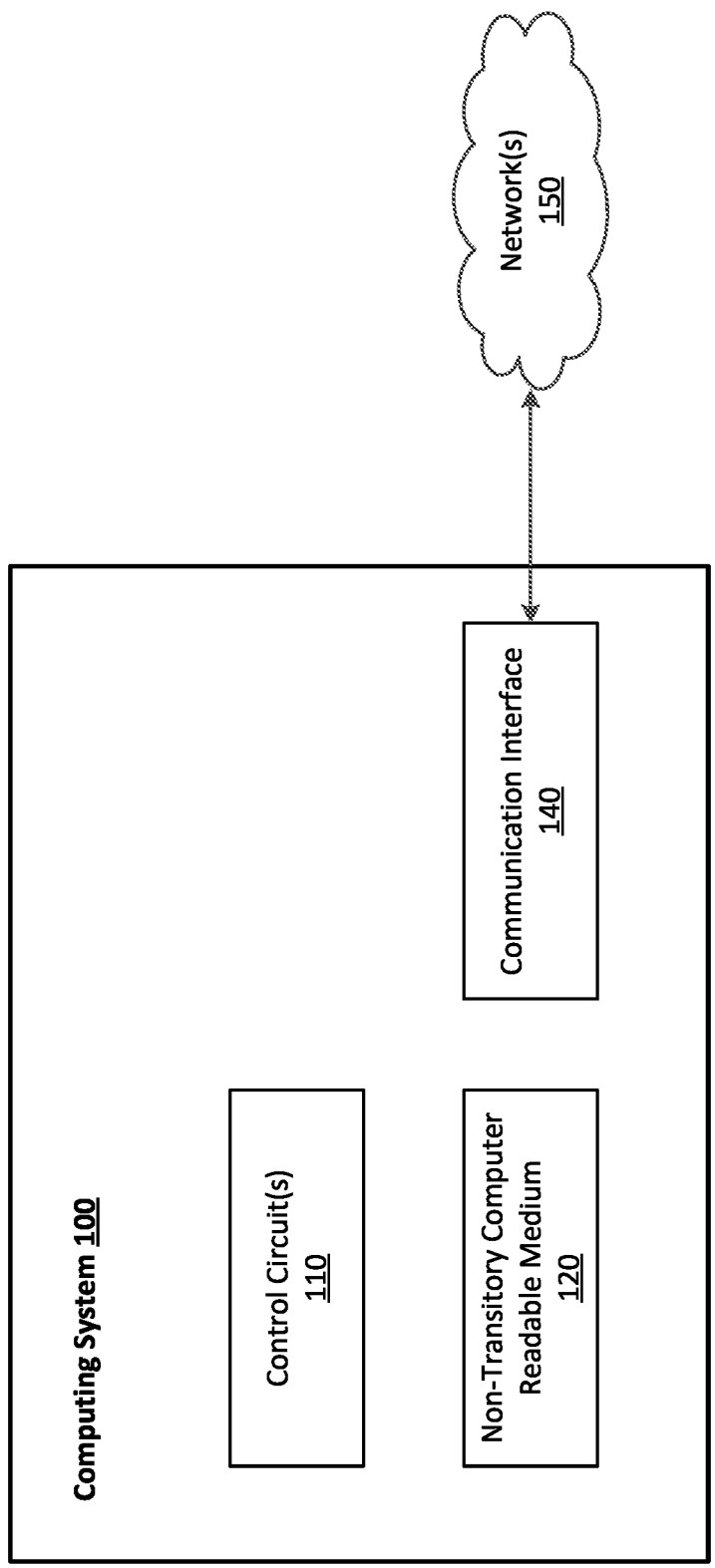
FIG. 1 is a block diagram depicting an example computing system in which embodiments described herein may be implemented, in accordance with examples described herein.

In certain autonomous vehicle implementations, the vehicle computing system processes sensor data (e.g., images, LIDAR data, etc.) as the data becomes available in real time. In other words, these autonomous vehicle implementations perform the various perception, object detection and classification, scene understanding, motion prediction, and/or ML inference tasks on sensor data in a non-deterministic manner. For example, an on-board computing system implementing a neural network for performing ML inference on two-dimensional image data will do so on each image sequentially as they are generated by the vehicle's cameras.

In accordance with examples described herein, a computing system can execute workloads for autonomous driving tasks in independent deterministic pipelines. For example, the computing system can comprise a set of workload processing chiplets that execute workloads in deterministic pipelines using dynamic scheduling and a reservation table implemented in a shared memory of the computing system. In various aspects, the computing system can comprise an SoC or multiple-SoC arrangement, with each SoC comprising multiple chiplets for performing the autonomous driving tasks. The SoC can include a central chiplet comprising the shared memory and reservation table where information corresponding to workloads (e.g., workload entries) are inputted. The SoC can include a sensor data input chiplet that obtains sensor data from the vehicle sensor system, which can include any combination of cameras, LIDAR sensors, radar sensors, ultrasonic sensors, proximity sensors, and the like.

Upon obtaining each item of sensor data (e.g., individual images, point clouds, radar pulses, etc.), the sensor data input chiplet can indicate availability of the sensor data in the reservation table, store the sensor data in a cache, and indicate the address of the sensor data in the cache. Through execution of workloads in accordance with a set of independent pipelines, a set of workload processing chiplets can monitor the reservation table for available workloads. As provided herein, the initial raw sensor data can be referenced in the reservation table and processed through execution by an initial set of workloads by the workload processing chiplets. As an example, this initial processing can comprise stitching images to create a 360-degree sensor view of the vehicle's surrounding environment, which can enable the chiplets to perform additional workloads on the sensor view (e.g., object detection and classification tasks).

When workloads are completed by the chiplets, dependency information for additional workloads in the reservation table can be updated to indicate so, and the additional workloads can become available for execution in the reservation table when no dependencies exist. In certain examples, the chiplets can monitor the reservation table by way of a workload window and instruction pointer arrangement, in which each entry of the reservation table is sequentially analyzed along the workload window by the workload processing chiplets. If a particular workload is ready for execution (e.g., all dependencies are resolved), the workload processing chiplets can execute the workload accordingly.

It is contemplated that execution of workloads in deterministic pipelines can facilitate verification and certification of an autonomous drive system (e.g., by a road safety authority). For example, a functional safety (FuSa) program that operates to compare and verify output of respective pipelines to ensure consistency in the ML inference operations and other scene understanding tasks.

In experimentation and controlled testing environments, system redundancies and automotive safety integrity level (ASIL) ratings for autonomy systems are not typically a priority consideration. As autonomous driving features continue to advance (e.g., beyond Level 3 autonomy), and autonomous vehicles begin operating more commonly on public road networks, the qualification and certification of E/E components related to autonomous operation of the vehicle will be advantageous to ensure operational safety of these vehicles. Furthermore, novel methods for qualifying and certifying hardware, software, and/or hardware/software combinations will also be advantageous in increasing public confidence and assurance that autonomous driving systems are safe beyond current standards. For example, certain safety standards for autonomous driving systems include safety thresholds that correspond to average human abilities and care. Yet, these statistics include vehicle incidences involving impaired or distracted drivers and do not factor in specified time windows in which vehicle operations are inherently riskier (e.g., inclement weather conditions, late night driving, winding mountain roads, etc.).

Automotive safety integrity level (ASIL) is a risk classification scheme defined by ISO 26262 (the functional safety for road vehicles standard), and is typically established for the E/E components of the vehicle by performing a risk analysis of potential hazards, which involves determining respective levels of severity (i.e., the severity of injuries the hazard can be expected to cause; classified between S0 (no injuries) and S3 (life-threatening injuries)), exposure (i.e., the relative expected frequency of the operational conditions in which the injury can occur; classified between E0 (incredibly unlikely) and E4 (high probability of injury under most operating conditions)), and controllability (i.e., the relative likelihood that the driver can act to prevent the injury; classified between C0 (controllable in general) and C3 difficult to control or uncontrollable)) of the vehicle operating scenario. As such, the safety goal(s) for any potential hazard event includes a set of ASIL requirements.

Hazards that are identified as quality management (QM) do not dictate any safety requirements. As an illustration, these QM hazards may be any combination of low probability of exposure to the hazard, low level of severity of potential injuries resulting from the hazard, and a high level of controllability by the driver in avoiding the hazard and/or preventing injuries. Other hazard events are classified as ASIL-A, ASIL-B, ASIL-C, or ASIL-D depending on the various levels of severity, exposure, and controllability corresponding to the potential hazard. ASIL-D events correspond to the highest integrity requirements (ASIL requirements) on the safety system or E/E components of the safety system, and ASIL-A comprises the lowest integrity requirements. As an example, the airbags, anti-lock brakes, and power steering system of a vehicle will typically have an ASIL-D grade, where the risks associated with the failure of these components (e.g., the probable severity of injury and lack of vehicle controllability to prevent those injuries) are relatively high.

As provided herein, the ASIL may refer to both risk and risk-dependent requirements, where the various combinations of severity, exposure, and controllability are quantified to form an expression of risk (e.g., an airbag system of a vehicle may have a relatively low exposure classification, but high values for severity and controllability). As provided above, the quantities for severity, exposure, and controllability for a given hazard are traditionally determined using values for severity (e.g., S0 through S3), exposure (e.g., E0 through E4), and controllability (e.g., C0 through C3) in the ISO 26262 series, where these values are then utilized to classify the ASIL requirements for the components of a particular safety system. As provided herein, certain safety systems can perform variable mitigation measures, which can range from alerts (e.g., visual, auditory, or haptic alerts), minor interventions (e.g., brake assist or steer assist), major interventions and/or avoidance maneuvering (e.g., taking over control of one or more control mechanisms, such as the steering, acceleration, or braking systems), and full autonomous control of the vehicle.

Current fully autonomous driving systems can comprise non-deterministic inference models, in which the system executes one or more perception, object detection, object classification, motion prediction, motion planning, and vehicle control techniques based on, for example, two-dimensional image data, to perform all autonomous driving tasks. It is contemplated that such implementations may be difficult or impossible to certify and provide an ASIL rating for the overall autonomous driving system. To address these shortcomings in current implementations, an autonomous driving system is provided herein that may perform deterministic, reflexive inference operations on specified hardware arrangements that allow for the certification and ASIL grading of various components, software aspects of the system, and/or the entire autonomous driving system itself.

In certain implementations, the computing system can perform one or more functions described herein using a learning-based approach, such as by executing an artificial neural network (e.g., a recurrent neural network, convolutional neural network, etc.) or one or more machine-learning models. Such learning-based approaches can further correspond to the computing system storing or including one or more machine-learned models. In an embodiment, the machine-learned models may include an unsupervised learning model. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as flash memory or magnetic memory. Computers, terminals, network-enabled devices are all examples of machines and devices that utilize processors, memory, and instructions stored on computer-readable mediums. Additionally, examples may be implemented in the form of computer programs, or a computer usable carrier medium capable of carrying such a program.

Example Computing System

FIG. 1 is a block diagram depicting an example computing system 100 in which embodiments described herein may be implemented, in accordance with examples described herein. In an embodiment, the computing system 100 can include one or more control circuits 110 that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), systems on chip (SoCs), or any other control circuit. In some implementations, the control circuit (s) 110 and/or computing system 100 may be part of, or may form, a vehicle control unit (also referred to as a vehicle controller) that is embedded or otherwise disposed in a vehicle (e.g., a Mercedes-Benz© car, truck, or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, an autonomous vehicle control system, or any other controller (the term "or" is used herein interchangeably with "and/or").

In an embodiment, the control circuit(s) 110 may be programmed by one or more computer-readable or computer-executable instructions stored on the non-transitory computer-readable medium 120. The non-transitory computer-readable medium 120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 120 may form, for example, a computer diskette, a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 120 may store computer-executable instructions or computer-readable instructions, such as instructions to perform the below methods described in connection with FIG. 4.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 110 to perform one or more functional tasks. The modules and computer-readable/executable instructions may be described as performing various operations or tasks when the control circuit(s) 110 or other hardware components execute the modules or computer-readable instructions.

In further embodiments, the computing system 100 can include a communication interface 140 that enables communications over one or more networks 150 to transmit and receive data. In various examples, the computing system 100 can communicate, over the one or more networks 150, with fleet vehicles using the communication interface 140 to receive sensor data and implement the methods described throughout the present disclosure. In certain embodiments, the communication interface 140 may be used to communicate with one or more other systems. The communication interface 140 may include any circuits, components, software, etc. for communicating via one or more networks 150 (e.g., a local area network, wide area network, the Internet, secure network, cellular network, mesh network, and/or peer-to-peer communication link). In some implementations, the communication interface 140 may include for example, one or more of a communications controller, receiver, transceiver, transmitter, port, conductors, software and/or hardware for communicating data/information.

As an example embodiment, the control circuit(s) 110 of the computing system 100 can include a SoC arrangement that facilitates the various methods and techniques described throughout the present disclosure. In various examples, the SoC can include a set of chiplets, including a central chiplet comprising a shared memory in which a reservation table is utilized to execute various autonomous driving workloads in independent deterministic pipelines, as described herein.

Example System-on-Chip

Figure 2:
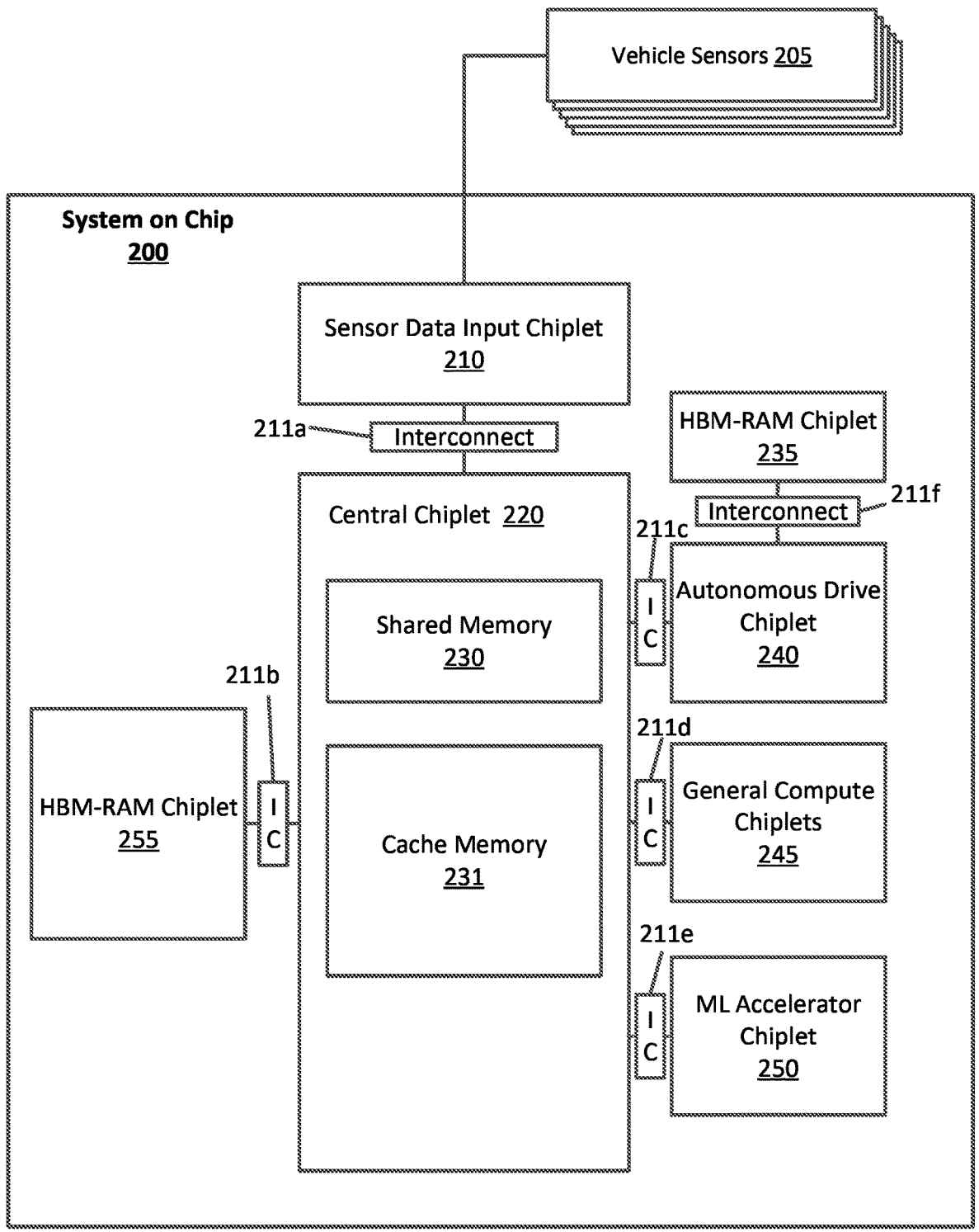
FIG. 2 is a block diagram depicting a system-on-chip (SoC) in which examples described herein may be implemented, in accordance with examples described herein.

FIG. 2 is a block diagram illustrating an example SoC 200, in accordance with examples described herein. The example SoC 200 shown in FIG. 2 can include additional components, and the components of system on chip 200 may be arranged in various alternative configurations other than the example shown. Thus, the system on chip 200 of FIG. 2 is described herein as an example arrangement for illustrative purposes and is not intended to limit the scope of the present disclosure in any manner.

Referring to FIG. 2, a sensor data input chiplet 210 of the system on chip 200 can receive sensor data from various vehicle sensors 205 of the vehicle. These vehicle sensors 205 can include any combination of image sensors (e.g., single cameras, binocular cameras, fisheye lens cameras, etc.), LIDAR sensors, radar sensors, ultrasonic sensors, proximity sensors, and the like. The sensor data input chiplet 210 can automatically dump the received sensor data as it's received into a cache memory 231 of the central chiplet 220. The sensor data input chiplet 210 can also include an image signal processor (ISP) responsible for capturing, processing, and enhancing images taken from the various vehicle sensors 205. The ISP takes the raw image data and performs a series of complex image processing operations, such as color, contrast, and brightness correction, noise reduction, and image enhancement, to create a higher-quality image that is ready for further processing or analysis by the other chiplets of the SoC 200. The ISP may also include features such as auto-focus, image stabilization, and advanced scene recognition to further enhance the quality of the captured images. The ISP can then store the higher-quality images in the cache memory 231.

In some aspects, the sensor data input chiplet 210 publishes identifying information for each item of sensor data (e.g., images, point cloud maps, etc.) to a shared memory 230 of a central chiplet 220, which acts as a central mailbox for synchronizing workloads for the various chiplets. The identifying information can include details such as an address in the cache memory 231 where the data is stored, the type of sensor data, which sensor captured the data, and a timestamp of when the data was captured.

To communicate with the central chiplet 220, the sensor data input chiplet 210 transmits data through an interconnect 211a. Interconnects 211a-f each represent die-to-die (D2D) interfaces between the chiplets of the SoC 200. In some aspects, the interconnects include a high-bandwidth data path used for general data purposes to the cache memory 231 and a high-reliability data path to transmit functional safety and scheduler information to the shared memory 230. Depending on bandwidth requirements, an interconnect may include more than one die-to-die interface. For example, interconnect 211a can include two interfaces to support higher bandwidth communications between the sensor data input chiplet 210 and the central chiplet 220.

In one aspect, the interconnects 211a-f implement the Universal Chiplet Interconnect Express (UCIe) standard and communicate through an indirect mode to allow each of the chiplet host processors to access remote memory as if it were local memory. This is achieved by using a specialized Network on Chip (NoC) Network Interface Unit (NIU) (allows freedom of interferences between devices connected to the network) that provides hardware-level support for remote direct memory access (RDMA) operations. In UCIe indirect mode, the host processor sends requests to the NIU, which then accesses the remote memory and returns the data to the host processor. This approach allows for efficient and low-latency access to remote memory, which can be particularly useful in distributed computing and data-intensive applications. Additionally, UCIe indirect mode provides a high degree of flexibility, as it can be used with a wide range of different network topologies and protocols.

In various examples, the system on chip 200 can include additional chiplets that can store, alter, or otherwise process the sensor data cached by the sensor data input chiplet 210. The system on chip 200 can include an autonomous drive chiplet 240 that can perform the perception, sensor fusion, trajectory prediction, and/or other autonomous driving algorithms of the autonomous vehicle. The autonomous drive chiplet 240 can be connected to a dedicated HBM-RAM chiplet 235 in which the autonomous drive chiplet 240 can publish all status information, variables, statistical information, and/or processed sensor data as processed by the autonomous drive chiplet 240.

In various examples, the system on chip 200 can further include a machine-learning (ML) accelerator chiplet 240 that is specialized for accelerating AI workloads, such as image inferences or other sensor inferences using machine learning, in order to achieve high performance and low power consumption for these workloads. The ML accelerator chiplet 240 can include an engine designed to efficiently process graph-based data structures, which are commonly used in AI workloads, and a highly parallel processor, allowing for efficient processing of large volumes of data. The ML accelerator chiplet 240 can also include specialized hardware accelerators for common AI operations such as matrix multiplication and convolution as well as a memory hierarchy designed to optimize memory access for AI workloads, which often have complex memory access patterns.

The general compute chiplets 245 can provide general purpose computing for the system on chip 200. For example, the general compute chiplets 245 can comprise high-powered central processing units and/or graphical processing units that can support the computing tasks of the central chiplet 220, autonomous drive chiplet 240, and/or the ML accelerator chiplet 250.

In various implementations, the shared memory 230 can store programs and instructions for performing autonomous driving tasks. The shared memory 230 of the central chiplet 220 can further include a reservation table that provides the various chiplets with the information needed (e.g., sensor data items and their locations in memory) for performing their individual tasks. Further description of the shared memory 230 in the context of the dual SoC arrangements described herein is provided below with respect to FIG. 4. The central chiplet 220 also includes the large cache memory 231, which supports invalidate and flush operations for stored data.

Cache miss and evictions from the cache memory 231 are sent by a high-bandwidth memory (HBM) RAM chiplet 255 connected to the central chiplet 220. The HBM-RAM chiplet 255 can include status information, variables, statistical information, and/or sensor data for all other chiplets. In certain examples, the information stored in the HBM-RAM chiplet 255 can be stored for a predetermined period of time (e.g., ten seconds) before deleting or otherwise flushing the data. For example, when a fault occurs on the autonomous vehicle, the information stored in the HBM-RAM chiplet 255 can include all information necessary to diagnose and resolve the fault. Cache memory 231 keeps fresh data available with low latency and less power required compared to accessing data from the HBM-RAM chiplet 255.

As provided herein, the shared memory 230 can house a mailbox architecture in which a reflex program comprising a suite of instructions is used to execute workloads by the central chiplet 220, general compute chiplets 245, and/or autonomous drive chiplet 240. In certain examples, the central chiplet 220 can further execute a functional safety (FuSa) program that operates to compare and verify output of respective pipelines to ensure consistency in the ML inference operations. In still further examples, the central chiplet 220 can execute a thermal management program to ensure that the various components of the SoC 200 operates within normal temperature ranges. Further description of the shared memory 230 in the context of out-of-order workload execution in independent deterministic pipelines is provided below with respect to FIG. 3.

Out-of-Order Workload Execution

Figure 3:
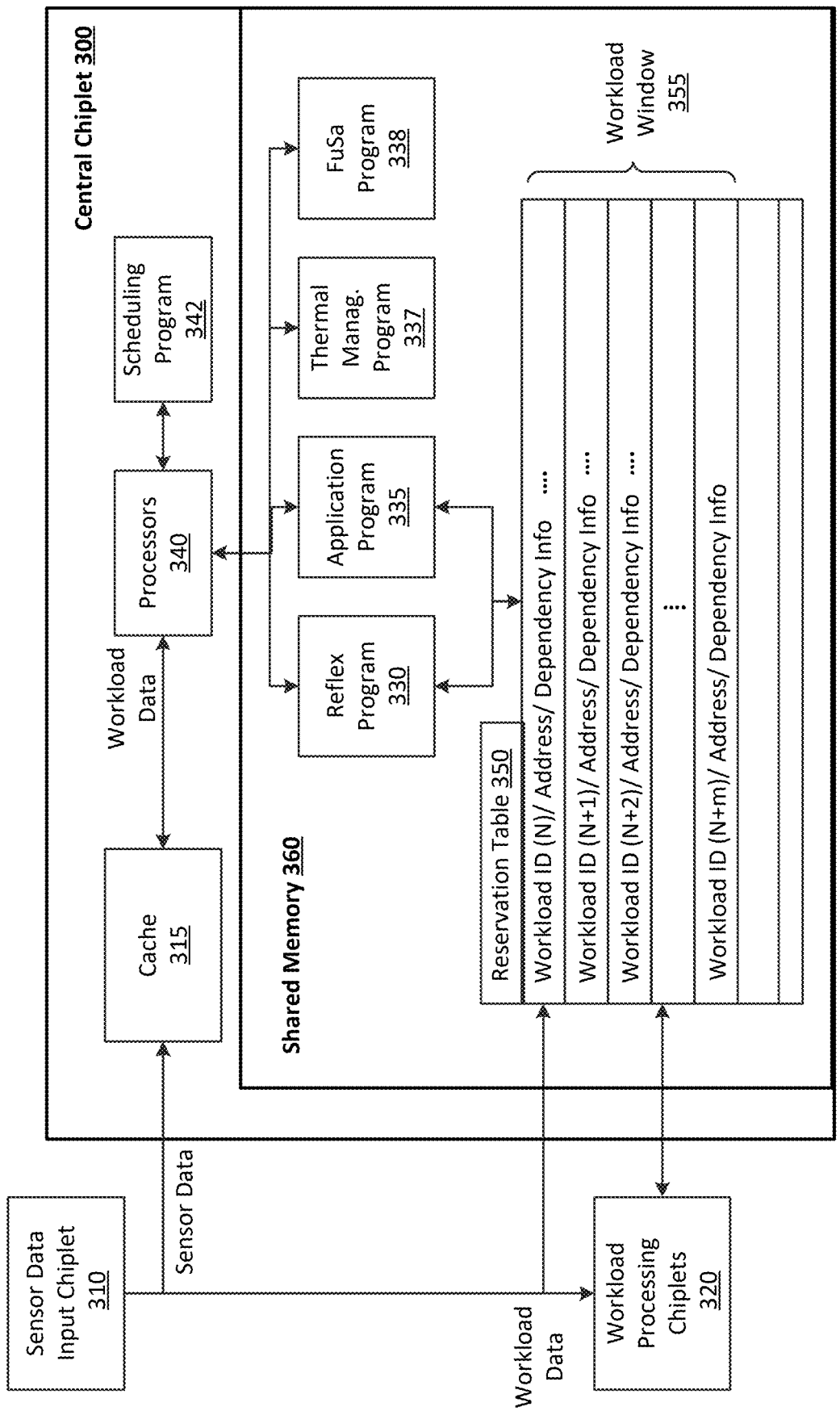
FIG. 3 is a block diagram illustrating an example central chiplet of an SoC arrangement for executing workloads in independent deterministic pipelines, in accordance with examples described herein.

FIG. 3 is a block diagram illustrating an example central chiplet 300 of an SoC arrangement for implementing out-of-order workload execution in independent deterministic pipelines, in accordance with examples described herein. The central chiplet 300 shown in FIG. 3 can correspond to the central chiplet 220 of the SoC 200 as shown in FIG. 2. Furthermore, the sensor data input chiplet 310 of FIG. 3 can correspond to the sensor data input chiplet 210 shown in FIG. 2, and the workload processing chiplets 320 shown in FIG. 3, can correspond to the general compute chiplets 245, ML accelerator chiplet 250, and/or the autonomous drive chiplet 240 shown in FIG. 2.

Referring to FIG. 3, the central chiplet 300 can include a shared memory 360 storing a reflex program 330 and an application program 335. As provided herein, the reflex program 330 can comprise a set of instructions for executing reflex workloads in independent pipelines. The reflex workloads can comprise sensor data acquisition, sensor fusion, and inference tasks that facilitate scene understanding of the surrounding environment of the vehicle. These tasks can comprise two-dimensional image processing, sensor fused data processing (e.g., three-dimensional LIDAR, radar, and image fusion data), neural radiance field (NeRF) scene reconstruction, occupancy grid determination, object detection and classification, motion prediction, and other scene understanding tasks for autonomous vehicle operation.

As further provided herein, the application program 335 can comprise a set of instructions for operating the vehicle controls of the autonomous vehicle based on the output of the reflex workload pipelines. For example, the application program 335 can be executed by one or more processors 340 of the central chiplet 300 and/or one or more of the workload processing chiplets 320 (e.g., the autonomous drive chiplet 240 of FIG. 2) to dynamically generate a motion plan for the vehicle based on the execution of the reflex workloads, and operate the vehicle's controls (e.g., acceleration, braking, steering, and signaling systems) to execute the motion plan accordingly.

In various implementations, the central chiplet 300 can include a set of one or more processors 340 (e.g., a transient-resistant CPU and general compute CPUs) that can execute a scheduling program 342 for out-of-order execution of workloads in a set of deterministic pipelines. In certain examples, one or more of the processors 340 can execute reflex workloads in accordance with the reflex program 330 and/or application workloads in accordance with the application program 335. As such, the processors 340 of the central chiplet 300 can reference, monitor, and update dependency information in workload entries of the reservation table 350 as workloads become available and are executed accordingly. For example, when a workload is executed by a particular chiplet, the chiplet updates the dependency information of other workloads in the reservation table 350 to indicate that the workload has been completed. This can include changing a bitwise operator or binary value representing the workload (e.g., from 0 to 1) to indicate in the reservation table 350 that the workload has been completed. Accordingly, the dependency information for all workloads having dependency on the completed workload is updated accordingly.

According to examples described herein, the reservation table 350 can include workload entries, each of which indicates a workload identifier that describes the workload to be performed, an address in the cache memory 315 and/or HBM-RAM of the location of raw or processed sensor data required for executing the workload, and any dependency information corresponding to dependencies that need to be resolved prior to executing the workload. In certain aspects, the dependencies can correspond to other workloads that need to be executed. Once the dependencies for a particular workload are resolved, the workload entry can be updated (e.g., by the chiplet executing the dependent workloads, or by the processors 240 of the central chiplet 300 through execution of the scheduling program 342). When no dependencies exist for a particular workload as referenced in the reservation table 350, the workload can be executed in a respective pipeline by a corresponding workload processing chiplet 320.

In various implementations, the sensor data input chiplet 310 obtains sensor data from the sensor system of the vehicle, and stores the sensor data (e.g., image data, LIDAR data, radar data, ultrasonic data, etc.) in a cache 315 of the central chiplet 300. The sensor data input chiplet 310 can generate workload entries for the reservation table 350 comprising identifiers for the sensor data (e.g., an identifier for each obtained image from various cameras of the vehicle's sensor system) and provide an address of the sensor data in the cache memory 315. An initial set of workloads be executed on the raw sensor data by the processors 340 of the central chiplet 300 and/or workload processing chiplets 320, which can update the reservation table 350 to indicate that the initial set of workloads have been completed.

As described herein, the workload processing chiplets 320 monitor the reservation table 350 to determine whether particular workloads in their respective pipelines are ready for execution. As an example, the workload processing chiplets 320 can continuously monitor the reservation table using a workload window 355 (e.g., an instruction window for multimedia data) in which a pointer can sequentially read through each workload entry to determine whether the workloads have any unresolved dependencies. If one or more dependencies still exist in the workload entry, the pointer progresses to the next entry without the workload being executed. However, if the workload indicates that all dependencies have been resolved (e.g., all workloads upon which the particular workload depends have been executed), then the relevant workload processing chiplet 320 and/or processors 340 of the central chiplet 300 can execute the workload accordingly.

As such, the workloads are executed in an out-of-order manner where certain workloads are buffered until their dependencies are resolved. Accordingly, to facilitate out-of-order execution of workloads, the reservation table 350 comprises an out-of-order buffer that enables the workload processing chiplets 320 to execute the workloads in an order governed by the resolution of their dependencies in a deterministic manner. It is contemplated that out-of-order execution of workloads in the manner described herein can increase speed, increase power efficiency, and decrease complexity in the overall execution of the workloads.

As described herein, the workload processing chiplets 320 can execute workloads in each pipeline in a deterministic manner, such that successive workloads of the pipeline are dependent on the output of preceding workloads in the pipeline. In various implementations, the processors 340 and workload processing chiplets 320 can execute multiple independent workload pipelines in parallel, with each workload pipeline including a plurality of workloads to be executed in a deterministic manner. Each workload pipeline can provide sequential output (e.g., for other workload pipelines or for processing by the application program 335 for autonomously operating the vehicle). Through concurrent execution of the reflex workloads in deterministic pipelines, the application program 335 can autonomously operate the controls of the vehicle along a travel route.

As an illustration, the scheduling program 342 can cause the processors 340 and workload processing chiplets 320 to perform out-of-order execution on the workloads in independent pipelines. In previous implementations, each image generated by the camera system of the vehicle would be processed or inferred on as the image becomes available. The instruction set would involve acquiring the image, scheduling inference on the image by a workload processing chiplet, performing inference on the image, acquiring a second image, scheduling inference on the second image by the workload processing chiplet, and performing inference on the second image, and so on across the suite of cameras of the vehicle. By reorganizing the order in which workloads are processed, the complexity of computation is significantly reduced. Specifically, for validating an autonomous driving system that utilizes out-of-order workload execution as described herein, the number of computational combinations for verification (e.g., by a safety authority) is significantly reduced.

As provided herein, the use of the workload window 355 and reservation table 350 referencing dependency information for workloads enables the workload processing chiplets 320 to operate more efficiently by performing out-of-order execution on the workloads. Instead of performing inference on images based on when they are available, a workload processing chiplet 320 can acquire all images from all cameras first, and then perform inference on all the images together. Accordingly, the workload processing chiplet 320 executes its workloads with significantly reduced complexity, increased speed, and reduced power requirements.

In further examples, the shared memory 360 can include a thermal management program 337 executable by the one or more processors 340 to manage the various temperatures of the SoC 200, operate cooling components, perform hardware throttling, switch to backup components (e.g., a backup SoC), and the like. In still further examples, the shared memory 360 can include a FuSa program 338 that performs functional safety tasks for the SoC 200, such as monitoring communications within the SoC (e.g., using error correction code), comparing output of different pipelines, and monitoring hardware performance of the SoC. According to examples described herein, the thermal management program 337 and FuSa program 338 can perform their respective tasks in independent pipelines.

Independent Deterministic Pipelines

Figure 4A:
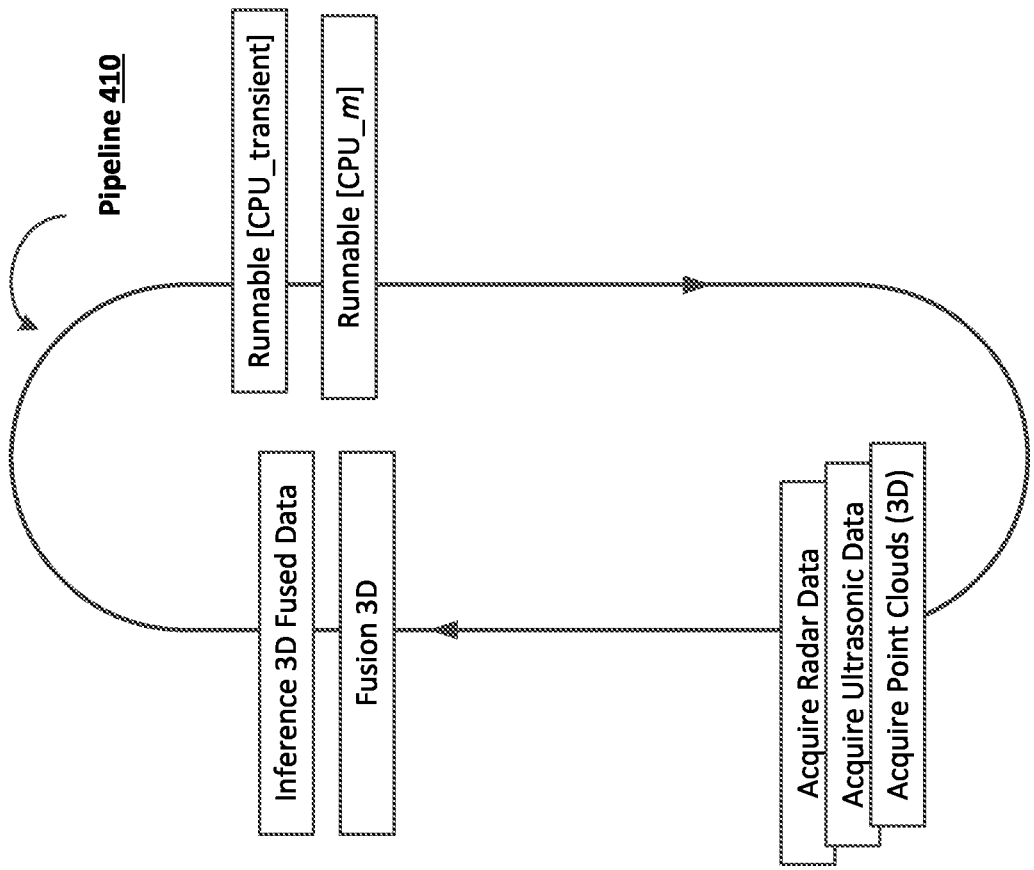
FIG. 4A depicts workloads being executed in a set of independent pipelines, according to examples described herein.
Figure 4A:
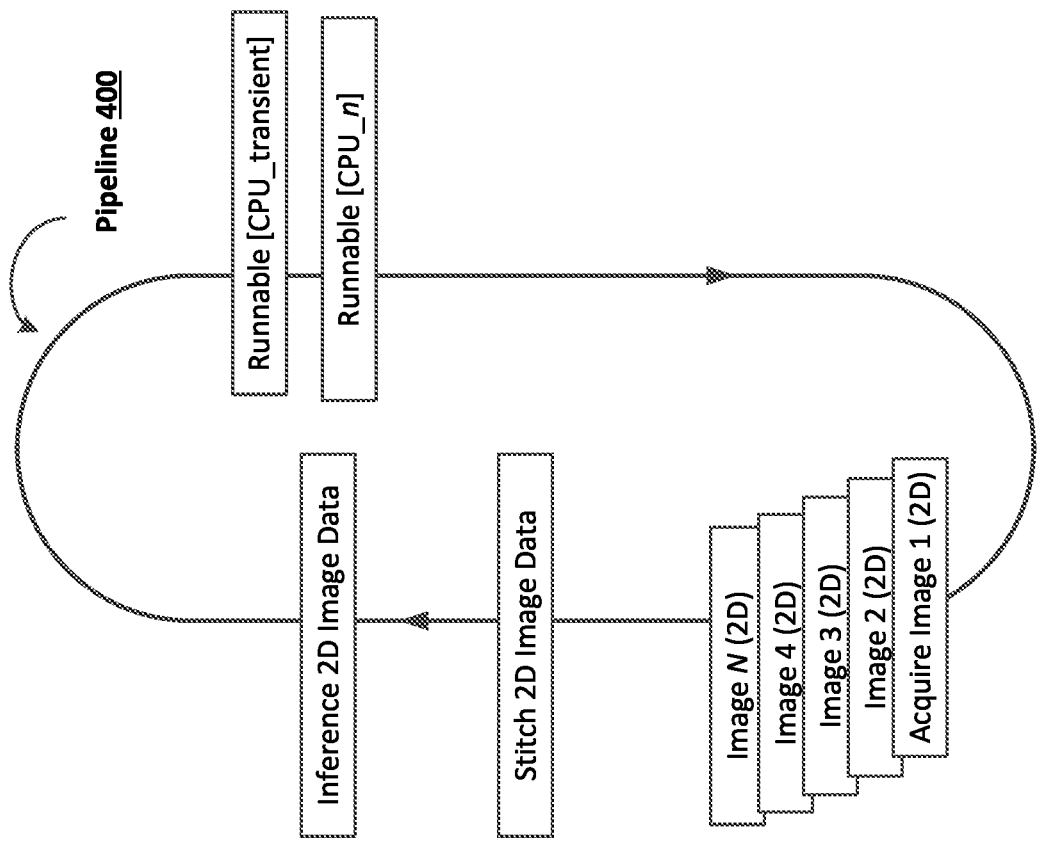
Figure 4B:
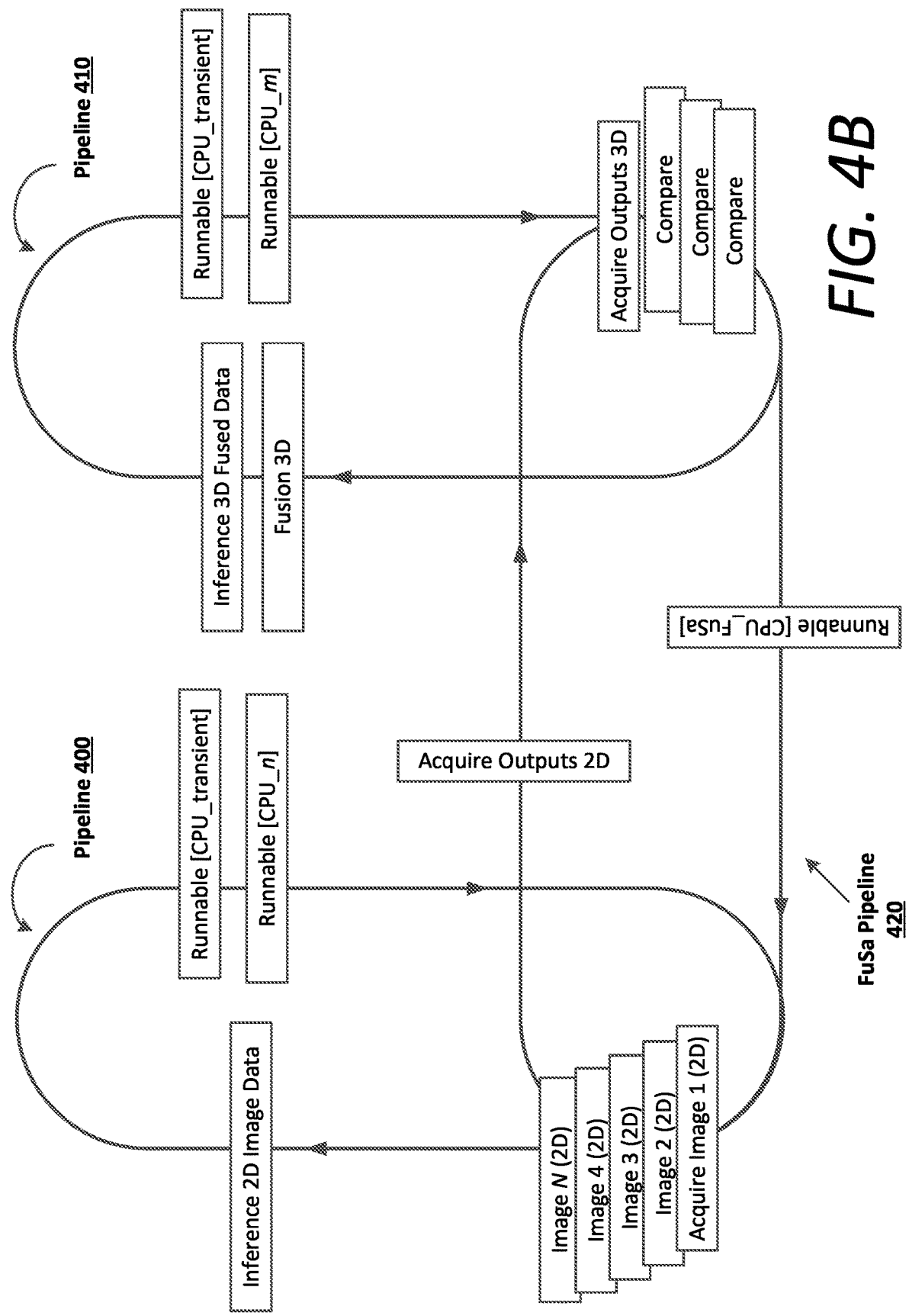
FIG. 4B depicts a functional safety (FuSa) pipeline operable to compare and verify the output of independent pipelines, according to examples described herein.

FIG. 4A depicts workloads being executed in a set of independent pipelines, according to examples described herein. FIG. 4B depicts a functional safety (FuSa) pipeline operable to compare and verify the output of independent pipelines, according to examples described herein. In the below discussion of FIGS. 4A and 4B, various workloads can be executed in independent deterministic pipelines by one or more processors 340 of the central chiplet 300 and/or the workload processing chiplets 320 through execution of the reflex program 330, application program 335, thermal program 337, FuSa program 338, and/or scheduling program 342 as depicted in FIG. 3.

Referring to FIG. 4A, pipeline 400 and pipeline 410 are executed in parallel by one or more chiplets of the SoC. While only pipelines 400 and 410 are shown in FIG. 4A, any number of pipelines can be executed in parallel by the central chiplet 300 and/or workload processing chiplets 320 in performing the reflex and application tasks described throughout the present disclosure. As described herein, the reflex and application tasks can comprise sensor data acquisition, sensor fusion, inference tasks that facilitate scene understanding of the surrounding environment of the vehicle, motion prediction, motion planning, and vehicle control tasks for autonomously operating a vehicle. Additional tasks may also be executed in individual pipelines, such as power control tasks, thermal management tasks, health monitoring tasks, and the like.

In various implementations, the scheduling program 342 can cause the workloads represented by the workload entries in the reservation table 350 to be executed deterministically in independent pipelines, such that the order of workload execution in each pipeline is consistent and non-reversible. Furthermore, the workloads executed in each pipeline can comprise a chain of dependency, such that the output of the pipelines are based on the same or similar workloads being sequentially executed in each pipeline. As such, complexity in the inference operations is significantly reduced, which can facilitate certification of each individual pipeline for autonomous driving purposes.

As an example, pipeline 400 can be tasked with performing inference on two-dimensional image data (e.g., to identify and classify other dynamic entities proximate to the vehicle in the images). A first workload in pipeline 400 can comprise obtaining images captured by each camera of the vehicle at a given time. A second workload in pipeline 400 can comprise stitching the images to form a 360-degree ribbon of the surrounding environment of the vehicle. A third workload in pipeline 400 can comprise performing inference on the two-dimensional image data (e.g., pixel analysis to identify the dynamic entities). Accordingly, an output of pipeline 400 can comprise a two-dimensional ribbon with dynamic entities identified (e.g., with a bounding box) and/or classified (e.g., as bicyclists, other vehicles, pedestrians, etc.).

As another example, pipeline 410 can be tasked with performing inference on three-dimensional sensor fusion data (e.g., comprising fused LIDAR, image, and/or radar data). For example, pipeline 410 can also be tasked with identifying external dynamic entities in the three-dimensional data. A first workload in pipeline 410 can comprise acquiring point clouds generated by LIDAR sensors of the vehicle at a given time, and acquiring radar and ultrasonic data from the same time. A second workload in pipeline 410 can comprise fusing the sensor data to provide a three-dimensional, fused sensor view of the surrounding environment of the vehicle. A third workload in pipeline 410 can comprise performing inference on the three-dimensional sensor fusion data to identify and/or classify the external dynamic entities.

As described herein, the workload processing chiplets (e.g., workload processing chiplets 320 and the central chiplet 300 of FIG. 3) can execute respective workloads in various other deterministic pipelines (e.g., in accordance with the reflex program 330 and/or application program 335 shown in FIG. 3). For example, a first pipeline can be dedicated for identifying traffic signals in two-dimensional image data, a second pipeline can be dedicated for identifying traffic signals in three-dimensional sensor fusion data, a third pipeline can be dedicated for identifying and classifying lane markings, a fourth pipeline can be dedicated for generating occupancy grid maps from the sensor data, a fifth pipeline can be dedicated for predicting the motion of external dynamic entities, a sixth pipeline can be dedicated for planning the motion of the vehicle based on the inferences from other pipelines, a seventh pipeline can be dedicated for controlling the vehicle's control systems to execute the motion plan generated by the sixth pipeline, and so on.

According to various examples, the workloads or tasks performed in each pipeline are ordered deterministically (e.g., by the scheduling program 342 of FIG. 3), which can significantly reduce complexity in certifying the autonomous drive system. For example, a single inference mechanism for an autonomous drive system that performs natural order processing using image data may not be certifiable due to the complexity and randomness of its workload executions, as well as the potential for outliers in the single inference mechanism (e.g., confusion about certain detected objects and lack of comparison between multiple inference mechanisms). These outliers may result in stuck states or collisions for the autonomous vehicle. With the use of deterministic pipelines that independently execute workloads, any outliers from one pipeline can be mitigated or otherwise overcome by comparison and confirmation mechanisms from other pipelines.

As shown in FIG. 4A, the various workloads of pipeline 400 and pipeline 410 can be executed as runnables on one or more processers of one or more chiplets of the SoC 200. In certain examples, a transient-resistant CPU (e.g., of central chiplet 220 and/or general compute chiplets 245) can execute the workloads in pipeline 400 and pipeline 410. It is contemplated that the use of robust, transient-resistant CPUs (e.g., ASIL-D rated CPUs) for executing workloads in the independent deterministic pipelines can further bolster the ASIL rating of the autonomous drive system as a whole. These transient-resistant CPUs can be manufactured for robustness in terms of reliability, resistance to heat, cold, radiation, wear, age, vibration, shock, etc. It is further contemplated that transient-resistant CPUs may not have the computing power of modern, non-transient-resistant CPUs (e.g., having an ASIL-B rating) that are designed and manufactured to maximize bandwidth and processing speed.

As shown in FIG. 4A, the workloads in pipeline 400 and pipeline 410 can be executed as runnables on multiple CPUs of the SoC 200 and/or multiple chiplets of the SoC 200. For example, a transient-resistant CPU can execute workloads in each pipeline 400, 410 and can be backed up by one or more state-of-the art CPUs that execute the same workloads in each pipeline 400, 410. The transient-resistant CPU(s) may execute workloads in each pipeline 400, 410 at a lower frequency than the other CPUs. For example, the transient-resistant CPU(s) can execute the workloads in each pipeline 400, 410 and provide output on the order of microseconds, whereas the other CPUs can provide output for each pipeline 400, 410 on the order of nanoseconds.

In an example, the transient-resistant CPUs may execute workloads in deterministic pipeline 400 and identify external dynamic objects (e.g., other vehicles, bicyclists, pedestrians, etc.) in two-dimensional image data every few microseconds. The other CPU may execute the same workloads in deterministic pipeline 400 to identify the same external dynamic entities every few nanoseconds (e.g., or at the same frequency that the images are generated by the cameras). Thus, the output by the transient-resistant CPU(s) can be verified or confirmed by the output of the other CPU(s) in each deterministic pipeline. This process can occur for each independent pipeline performing inference operations (e.g., the reflex program 330), and can further be utilized for the application program 335, thermal management program 337, and/or the FuSa program 338.

In certain aspects, the workloads of pipeline 400 and pipeline 410 can be executed by one or more CPUs of the central chiplet 220 and/or one or more CPUs of the general compute chiplets 245. FIG. 4B shows an example FuSa pipeline 420 that dynamically compares and verifies the output of the runnables for each pipeline 400, 410, according to various examples. In certain implementations, the FuSa pipeline 420 can compare the output of multiple runnables performed by different CPUs in each pipeline 400, 410, as well as comparing the output of pipeline 400 with the output of pipeline 410. In the example of identifying and classifying dynamic external entities, the two-dimensional output from pipeline 400 can indicate the entities in image data that lacks precise distance information to each entity, whereas the three-dimensional output from pipeline 410 may lack information such as color and edge detail that facilitates classification of the external entities. Furthermore, the sensor fused data processed in pipeline 410 can include radar and/or ultrasonic data that can provide detailed proximity and or speed differential information of the external entities.

As such, the output of pipeline 400 and pipeline 410 have different outliers that, when viewed alone, can affect the accuracy the autonomous drive system's capabilities. As described herein, the various workload processing chiplets (e.g., chiplets 320 and central chiplet 300 of FIG. 3) can execute workloads in any number of pipelines, with each pipeline having different outliers based on the sensor data being processed. As further described herein, the output of certain pipelines can be compared with the output of other pipelines through the execution of one or more FuSa pipelines 420 that acquire and dynamically verify the respective output of different independent pipelines.

As shown in FIG. 4B, the FuSa pipeline 420 can acquire the output of pipeline 400 and pipeline 410 and compare and verify their output. As described herein, the output can correspond to any inference operations relating to the processing of sensor data from the sensor system of the vehicle. In various examples, the runnable of the FuSa pipeline 420 can be executed on a dedicated CPU (e.g., on the central chiplet 220 of the SoC 200 arrangement).

In the example shown in FIG. 4B, the FuSa pipeline 420 acquires the two-dimensional output of pipeline 400 and the three-dimensional output of pipeline 410. The FuSa pipeline 420 then compares the two-dimensional and three-dimensional output to determine whether they are consistent with each other. For inferences involving the identification and/or classification of external dynamic entities, the FuSa pipeline 420 will confirm whether pipeline 400 and pipeline 410 have both separately identified and/or classified the same external dynamic entities in the surrounding environment of the vehicle using different sensor data and/or techniques having different outliers.

While the examples shown in FIGS. 4A and 4B show pipelines involving different types of sensor data, numerous other deterministic pipelines are contemplated in which a FuSa pipeline is utilized to compare and dynamically verify their output. For example, this can include a FuSa pipeline that compares output of multiple pipelines tasked to identify traffic signals and traffic signal states, output of motion prediction pipelines tasked to predict the motion of external dynamic entities, and comparable output of other deterministic pipelines that facilitate in autonomously operating the vehicle. As such, any issue that occurs in any pipeline can be readily detected and flagged by a FuSa pipeline. It is contemplated that the use of transient-resistant CPUs with support from general compute CPUs, the execution of workloads in verifiable deterministic pipelines, and the use of FuSa pipelines to dynamically compare and verify the output from the deterministic pipelines, can all combine to provide an increased ASIL rating (e.g., an ASIL-D rating) for the autonomous driving system of the vehicle.

Methodology

Figure 5:
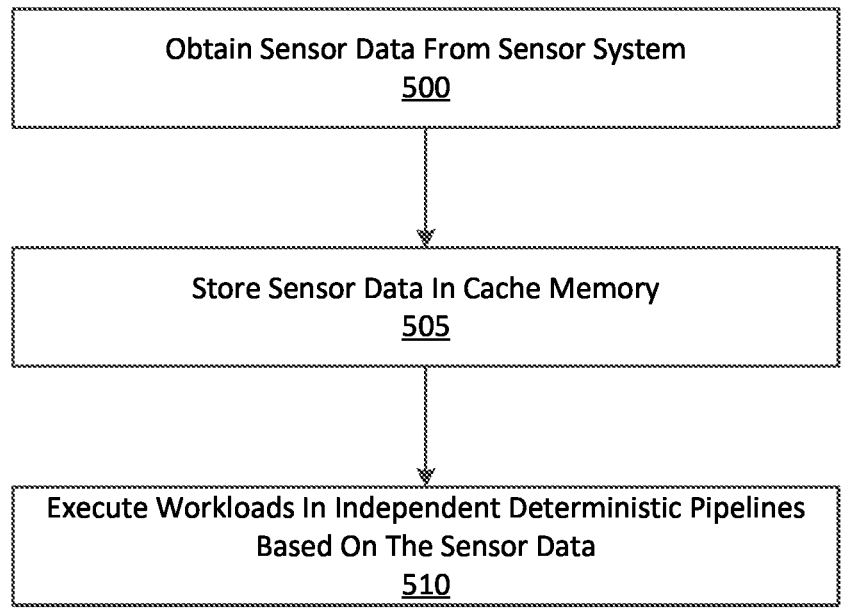
FIGS. 5 and 6 are a flow charts describing methods of executing workloads in independent pipelines, according to examples described herein.
Figure 6:
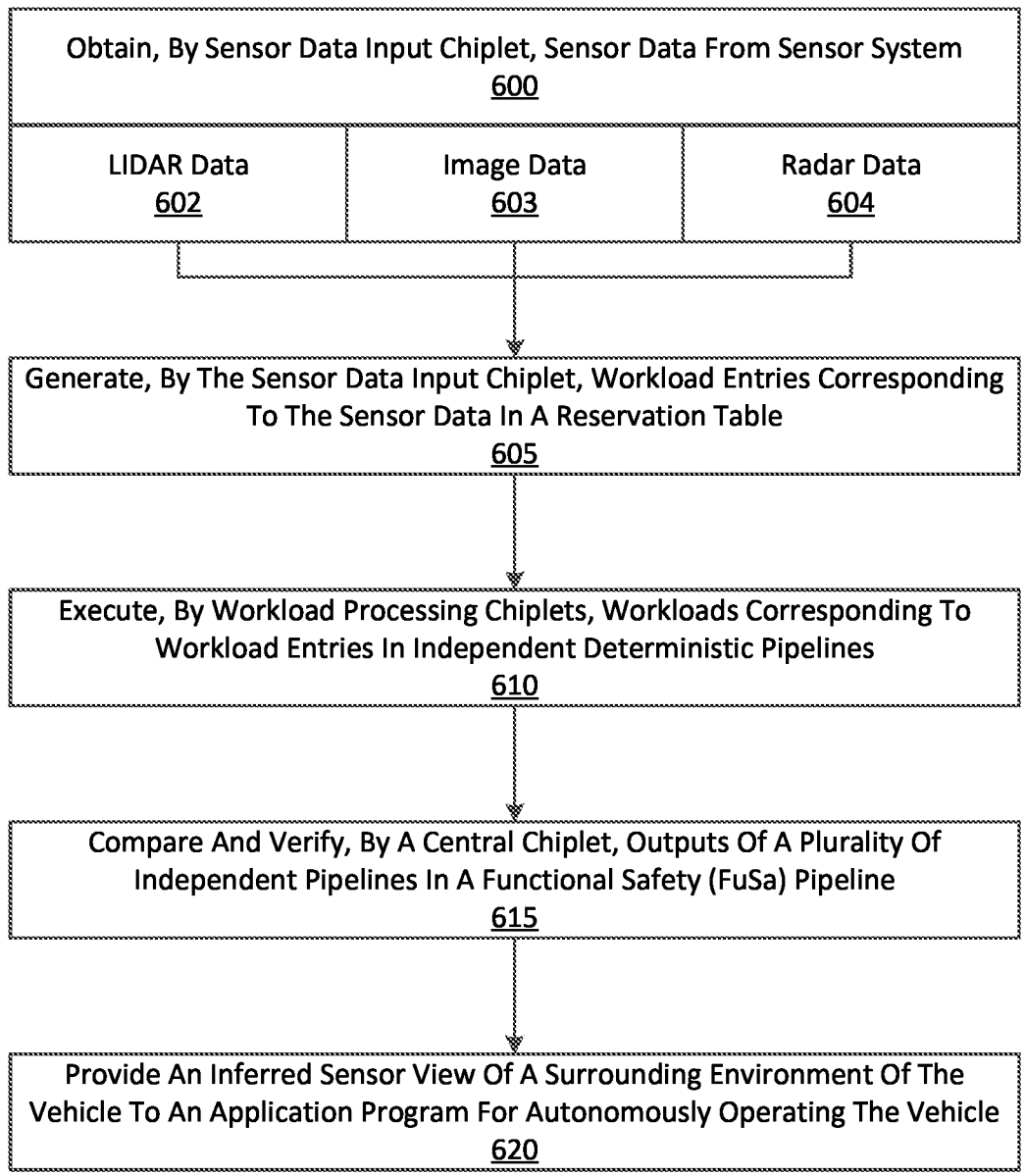

FIGS. 5 and 6 are flow charts describing methods of executing workloads in independent pipelines, according to examples described herein. In the below discussion of the methods of FIGS. 5 and 6, reference may be made to reference characters representing certain features described with respect to the system diagrams of FIGS. 1 through 4B. Furthermore, the steps described with respect to the flow charts of FIGS. 5 and 6 may be performed by the computing system 100 and/or the workload processing chiplets 320 and central chiplet 300 of the system-on-chip 200 as shown and described with respect to FIGS. 1 through 3. Further still, certain steps described with respect to the flow charts of FIGS. 5 and 6 may be performed prior to, in conjunction with, or subsequent to any other step, and need not be performed in the respective sequences shown.

Referring to FIG. 5, at block 500, a computing system 100 can obtain sensor data from a sensor system (e.g., comprising LIDAR sensors, radar sensors, cameras, ultrasonic sensors, etc.). At block 505, the computing system 100 can store the sensor data in a cache memory. At block 510, the computing system 100 can then execute workloads in a set of independent deterministic pipelines based on the sensor data. As provided throughout the present disclosure, the execute of multimedia workloads in deterministic pipelines can reduce complexity for a variety of applications, in particular, those that may require certification by, for example, a security or safety authority.

FIG. 6 is another flow describing a method of executing workloads in independent deterministic pipelines in the field of autonomous driving, according to examples described herein. Referring to FIG. 6, at block 600, a sensor data input chiplet 310 can obtain sensor data from a set of vehicle sensors 205. As described herein, the sensor data from the vehicle sensors 205 can comprise any combination of LIDAR data, at block 602, image data, at block 603, radar data, at block 604, and/or other forms of sensor data (e.g., ultrasonic data, IR data, etc.). In certain implementations, at block 605, the sensor data input chiplet 310 can generate workload entries corresponding to the sensor data in a reservation table 350 included in a shared memory 360 of a central chiplet 300.

At block 610, a set of workload processing chiplets (e.g., processing chiplets 320 and/or the central chiplet 300) can execute workloads corresponding to the workload entries in a set of independent deterministic pipelines. In particular, the scheduling program 342 of the central chiplet 300 can schedule specified sets of workloads to be executed in a deterministic manner within independent pipelines. For example, the scheduling program 342 can impart dependency information in the workload entries such that they are not executed until the dependency information is resolved. This dependency information can comprise other workloads that need to be executed prior to execution of that particular workload. In further examples, the workload processing chiplets can execute the workloads in the set of independent pipelines deterministically using the reservation table 350 as an out-of-order buffer (e.g., by sequentially analyzing workload entries in a workload window 355 using an instruction pointer for multimedia content).

As provided herein, the workload processing chiplets can execute the workloads in the set of independent pipelines to perform a set of tasks for operating a vehicle. In various examples, the set of tasks can comprise a plurality of image stitching tasks, sensor fusion tasks, machine learning inference tasks, object detection tasks, object classification tasks, scene understanding tasks, motion prediction tasks, and the like. These tasks can comprise inference operations to process the surrounding environment of the vehicle such that an application program 335 can successfully operate the vehicle along a travel route. As such, the set of independent pipelines can provide output (e.g., an inferred sensor view of the surrounding environment) to the application program 335 for autonomously operating the vehicle.

At block 615, the central chiplet 300 can include a FuSa program that dynamically compares and verifies output of a plurality of independent pipelines in a FuSa pipeline in a deterministic manner, as shown in the example FuSa pipeline 420 of FIG. 4B. As described throughout the present disclosure, the SoC 200 can include chiplets (e.g., the workload processing chiplets 320 and/or central chiplet 300) that comprise one or more transient-resistant CPUs that execute workloads in independent pipelines. The use of transient-resistant CPUs, FuSa pipelines, and the deterministic ordering of workload execution can be combined to facilitate an increased ASIL rating of the autonomous drive system of the vehicle.

At block 620, execution of the workloads in deterministic pipelines (e.g., via the reflex program 330) can result in generating an inferred sensor view of a surrounding environment of the vehicle, which can be provided to an application program 335 for autonomously operating the vehicle. It is contemplated that each independent deterministic pipeline corresponding to the reflex program 330 can be certified (e.g., for use on public roads by a safety authority). These pipelines can include all inference operations that correspond to perception, object detection and classification, occupancy grid determination, motion prediction and/or planning, and any other scene understanding task for autonomously operating the vehicle.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature.

What is claimed is:

1. A computing system, comprising:
a sensor data input chiplet to obtain sensor data from a sensor system of a vehicle; and
one or more workload processing chiplets to execute a plurality of workloads in a set of independent pipelines based on the sensor data, the one or more workload processing chiplets implementing a reservation table that includes a plurality of workload entries, each workload entry identifying a corresponding workload and dependency information for the corresponding workload, the dependency information indicating whether a dependency is to be resolved with the corresponding workload before the corresponding workload is executed;
wherein for each workload of the plurality of workloads that is completed, the one or more workload processing chiplets update the dependency information of any workload in the reservation table that is identified as having the dependency on the completed workload, to indicate the dependency has been resolved.

2. The computing system of claim 1, wherein the one or more workload processing chiplets execute the workloads in the set of independent pipelines to perform a set of tasks for operating the vehicle.

3. The computing system of claim 2, wherein the set of tasks comprise a plurality of: image stitching tasks, sensor fusion tasks, machine learning inference tasks, object detection tasks, object classification tasks, scene understanding tasks, and motion prediction tasks.

4. The computing system of claim 3, wherein the one or more workload processing chiplets provide output of the set of independent pipelines to an application program for autonomously operating the vehicle.

5. The computing system of claim 4, wherein the output of the set of independent pipelines comprises an inferred sensor view of a surrounding environment of the vehicle to facilitate autonomous operation of the vehicle.

6. The computing system of claim 1, wherein the one or more workload processing chiplets execute the workloads in the set of independent pipelines deterministically using the reservation table for the workloads as an out-of-order buffer.

7. The computing system of claim 1, wherein each workload entry of the plurality of workload entries includes a cache address for workload data to execute the respective workload.

8. The computing system of claim 1, wherein the one or more workload processing chiplets include a central chiplet comprising at least one transient-resistant CPU that executes a subset of the workloads in a plurality of parallel independent pipelines to enable autonomous operation of the vehicle.

9. The computing system of claim 8, wherein the central chiplet dynamically compares and verifies output of the plurality of parallel independent pipelines in a functional safety (FuSa) pipeline.

10. The computing system of claim 9, wherein the at least one transient-resistant CPU and the FuSa pipeline are provided to facilitate an automotive safety integrity level (ASIL) grade of an autonomous drive system of the vehicle.

11. The computing system of claim 1, wherein the one or more workload processing chiplets are included on a system-on-chip (SoC) arrangement of the computing system.

12. The computing system of claim 11, wherein the SoC arrangement comprises the sensor data input chiplet, a central chiplet, one or more general compute chiplets, an autonomous drive chiplet, a machine learning accelerator chiplet, and one or more high-bandwidth memory chiplets.

13. A non-transitory computer readable medium storing instructions that, when executed by one or more processors, cause the one or more processors to:
obtain, by a sensor data input chiplet, sensor data from a sensor system of a vehicle;
execute, by one or more workload processing chiplets, a plurality of workloads in a set of independent pipelines based on the sensor data; and
implement a reservation table, the reservation table including a plurality of workload entries, each workload entry identifying a corresponding workload and dependency information for the corresponding workload, the dependency information indicating whether a dependency is to be resolved with the corresponding workload before the corresponding workload is executed;
wherein for each workload of the plurality of workloads that is completed, update the dependency information of any workload in the reservation table that is identified as having the dependency on the completed workload, to indicate the dependency has been resolved.

14. The non-transitory computer readable medium of claim 13, wherein the one or more workload processing chiplets execute the workloads in the set of independent pipelines to perform a set of tasks for operating the vehicle.

15. The non-transitory computer readable medium of claim 14, wherein the set of tasks comprise a plurality of: image stitching tasks, sensor fusion tasks, machine learning inference tasks, object detection tasks, object classification tasks, scene understanding tasks, and motion prediction tasks.

16. The non-transitory computer readable medium of claim 15, wherein the one or more workload processing chiplets provide output of the set of independent pipelines to an application program for autonomously operating the vehicle.

17. The non-transitory computer readable medium of claim 16, wherein the output of the set of independent pipelines comprises an inferred sensor view of a surrounding environment of the vehicle to facilitate autonomous operation of the vehicle.

18. The non-transitory computer readable medium of claim 13, wherein the one or more workload processing chiplets execute the workloads in the set of independent pipelines deterministically using the reservation table for the workloads as an out-of-order buffer.

19. The non-transitory computer readable medium of claim 13, wherein each workload entry of the plurality of workload entries includes a cache address for workload data to execute the respective workload.

20. A computer-implemented method, comprising:
obtaining, by a sensor data input chiplet, sensor data from a sensor system of a vehicle;
executing, by one or more workload processing chiplets to execute a plurality of workloads in a set of independent pipelines based on the sensor data; and
implementing a reservation table, the reservation table including a plurality of workload entries, each workload entry identifying a corresponding workload and dependency information for the corresponding workload, the dependency information indicating whether a dependency is to be resolved with the corresponding workload before the corresponding workload is executed;
wherein for each workload of the plurality of workloads that is completed, updating the dependency information of any workload in the reservation table that is identified as having the dependency on the completed workload, to indicate the dependency has been resolved.

* * * * *